`2,994,692`
PROCESS OF PREPARING N-TRITYL PEPTIDES
Gaston Amiard, Noisy-le-Sec, and René Heymes, Romainville, France, assignors to UCLAF, Paris, France, a corporation of France
No Drawing. Filed Aug. 10, 1955, Ser. No. 527,634
Claims priority, application France Aug. 18, 1954
9 Claims. (Cl. 260—112)

The present invention relates to an improved process of producing peptides and more particularly to a process of producing peptides by employing N-trityl peptides as intermediate products, and to new N-trityl peptides obtained thereby.

It is one object of the present invention to provide a new and very advantageous process of producing peptides and their N-trityl substitution products, which process does not have the disadvantages of the heretofore known processes and which according to this invention is applied to amino acids.

Another object of the present invention is to provide new and valuable peptide compounds wherein the free amino group is substituted by a trityl group.

Still another object of the present invention is to provide new mixed anhydrides of N-trityl substituted amino acids or N-trityl substituted peptides with other acids, which mixed anhydrides are especially suitable for conversion into peptides and their N-trityl substitution products.

A further object of the present invention is to provide a simple and effective process of hydrolyzing N-trityl peptides to form the corresponding peptides and to recover triphenyl carbinol.

Another object of the present invention is to provide new esters of N-trityl peptides useful for conversion, by saponification, into the N-trityl peptides.

Another object of the present invention is to provide new N-trityl substituted amino acids useful for conversion into peptides.

Other objects of the present invention and advantageous features thereof will become apparent as the description proceeds.

The new N-trityl peptides obtained as intermediates in the process according to the present invention correspond to the following Formula I

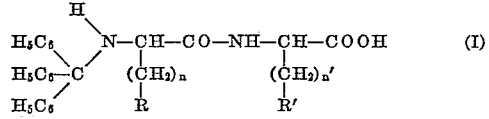

In this formula:
R indicates hydrogen, an alkyl, aryl or heterocyclic radical which may be substituted by a hydroxyl group or by a group containing sulfur,
R' indicates hydrogen, an alkyl, aryl, or heterocyclic radical which is identical with or different from R and which may also contain a hydroxyl group or a group containing sulfur, while
n is a numeral from 0 to 8, and
n' is a numeral from 0 to 8 which may be identical with or different from n.

Such N-trityl peptides are readily converted by hydrolysis into the corresponding peptide whereby triphenyl carbinol is split off and can readily be separated by filtration. Hydrolysis is preferably effected by treating the N-trityl peptide and aqueous acetic acid for several minutes.

Said new hydrolysis process of setting free the amino group involves operation under gentle conditions so that racemization of optically active peptides does not take place. Hydrolysis proceeds very rapidly and the conditions of hydrolysis are better adapted to industrial application than the conditions of hydrolysis of other N-substituted peptides as carried out heretofore.

The starting materials for the process according to the present invention, the N-trityl amino acids, are readily obtained, for instance, by reacting triphenyl methyl chloride, which shall be designated hereinafter, for brevity's sake, as trityl chloride, with an ester of an amino acid in an inert organic solvent, such as a polyhalogenated aliphatic hydrocarbon, for instance, chloroform, dichloro ethane, and others, and in the presence of a tertiary base, for instance, of triethylamine, pyridine, methyl ethyl pyridine, and others. Frequently, it is of advantage not to use the free ester in this condensation reaction but its hydrochloride. When using the hydrochloride, however, it is necessary to operate in the presence of two molecules of the tertiary base of which one molecule serves to set the ester free from its hydrochloride. The resulting N-trityl amino acid ester is subsequently saponified to yield the desired N-trityl amino acid. To convert the ester of an amino acid substituted by a hydroxyl group into its N-trityl substitution product, the reaction is carried out with only one molecule of trityl chloride whereby the N-trityl substituted derivative is predominantly formed.

Trityl chloride can also be reacted with the free amino acid in place of its esters.

To produce peptides from such N-trityl amino acids according to the present invention, the N-trityl amino acid is first converted into a suitable mixed anhydride with another acid and, preferably, into the mixed anhydride with an alkyl ester of chloro formic acid and most advantageously with the ethyl ester of chloro formic acid.

The process of producing such mixed anhydrides consists in reacting an N-trityl-α-amino acid with an agent capable of forming a mixed anhydride therewith, such as, for instance, the alkyl ester of chloro formic acid at a temperature preferably near 0° C. in an organic solvent, such as, for instance, chloroform, in the presence of an acid binding agent and especially in the presence of a tertiary organic base such as triethylamine or pyridine. The resulting solution of the mixed anhydride is directly treated, at a temperature preferably near 0° C., with an α-amino acid or a peptide the carboxyl groups of which are protected, for instance, by conversion into an ester, amide, or anilide. The resulting N-trityl substituted peptide having its carboxyl group protected, for instance, by an ester, amide, or anilide group, can readily be isolated from the reaction mixture in crystalline form. The carboxyl group of said N-trityl substituted peptide is set free by saponification. The free peptide is obtained by subsequently hydrolyzing the N-trityl peptide, as stated hereinabove, by heating with dilute acetic acid.

The trityl group can be introduced into the free amino group of a peptide ester, thereafter setting free the carboxyl group, converting the resulting N-trityl peptide into a suitable mixed anhydride, for instance, by reaction with an alkyl ester of chloro formic acid, and reacting said mixed anhydride with an ester, amide, or anilide of an amino acid or a peptide. In this manner polypeptides are obtained.

Instead of first saponifying the resulting N-trityl peptide esters, amides, or anilides and then splitting off, by hydrolysis, the trityl group, it is also possible to first split off the trityl group by boiling with dilute acetic acid and then to saponify the resulting peptide ester, amine, or anilide.

The following examples serve to illustrate the present invention without, however, limiting the same thereto.

It is, of course, possible to use other solvents, tertiary bases, reaction components, to vary the reaction temperature and duration, and to employ other N-trityl-α-amino acids and their derivatives than those mentioned in the examples without departing from the principles set forth herein and in the claims annexed thereto.

The melting points given in the following examples are points of instantaneous melting determined on the Maquenne block.

EXAMPLE 1

Preparation of N-trityl glycine $(C_6H_5)_3C-NH-CH_2-CO_2H$ (a) PREPARATION OF THE ETHYL ESTER OF N-TRITYL GLYCINE

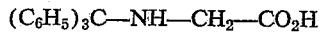

1.4 g. of the hydrochloride of the ethyl ester of glycine are dissolved in 14 cc. of anhydrous chloroform containing 3 cc. of anhydrous triethylamine. The solution is cooled to 0° C. 2.8 g. of triphenyl methyl chloride are added thereto, while stirring. Thereby, solution takes place immediately. Soon the hydrochloride of triethylamine starts to crystallize. After the reaction is complete, the reaction mixture is allowed to stand for about 1 hour and is washed with water. The washed chloroform solution is dried over magnesium sulfate and evaporated to dryness. The remaining ethyl ester of N-trityl glycine is obtained in oily form. On dissolving said oil in a small amount of methanol, it is converted into a crystalline mass. The crystalline ester can be saponified as such or after purification by recrystallization from a mixture of benzene and petroleum ether (1:5). The purified compound melts at 112–113° C.

(b) SAPONIFICATION OF THE ETHYL ESTER OF N-TRITYL GLYCINE

The crude ester obtained as described hereinabove under (a) is heated under reflux with 5 cc. of a solution of 20% potassium hydroxide in methanol for 2 to 3 minutes. 25 cc. of water are added thereto and the methanol is removed by distillation. The remaining aqueous solution is cooled and acidified by means of acetic acid. N-trityl glycine precipitates in the form of an oil which, subsequently, crystallizes. The crystals are filtered off, washed with water, and dried. 3 g. of N-trityl glycine are obtained thereby. Its melting point is 176–178° C. The yield exceeds 95%. By recrystallization from ethanol the melting point is increased to 179–180° C.

The compound is soluble, on heating, in aqueous alkaline solutions, only slightly soluble in acetone, benzene, chloroform, ethanol, and ether, and insoluble in water. Its triethylamine salt is very soluble in chloroform.

Analysis.—$C_{21}H_{19}O_2N$ (molecular weight 317.37).—Calculated: 79.47% C; 6.03% H; 4.41% N. Found: 79.3% C; 6.1% H; 4.4% N.

EXAMPLE 2

Preparation of N-trityl glycine 1.5 g. of glycine are dissolved in 7.3 cc. of a 2.75 N methanolic potassium hydroxide solution. 10 cc. of methanol are added thereto and the resulting solution is cooled to 0° C. Thereupon a solution of 2.8 g. of triphenyl methyl chloride in 20 cc. of ether is added while stirring and the mixture is allowed to stand overnight in a refrigerator.

The mixture is washed with water and the ethereal solution is extracted with N sodium hydroxide solution. The combined aqueous solutions are freed from methanol by distillation. The resulting aqueous solution is cooled and acidified with acetic acid in the same manner as described in Example 1. 2.2 g. of N-trityl glycine having a melting point of 175–177° C. are obtained hereby.

EXAMPLE 3

Preparation of N-trityl-DL-α-alanine

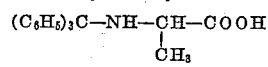

(a) PREPARATION OF THE ETHYL ESTER OF N-TRITYL-DL-α-ALANINE 1.53 g. of the hydrochloride of the ethyl ester of DL-alanine, dissolved in 15 cc. of chloroform containing 3 cc. of triethylamine, are reacted with 2.8 g. of triphenyl methyl chloride as described hereinabove in Example 1 under (a). The reaction mixture is worked up in the same manner as disclosed in said example. Thereby, 3.5 g. of the ethyl ester of N-trityl-DL-α-alanine are obtained. The yield amounts to 97%. The melting point of said ester, on recrystallization from a mixture of benzene and petroleum ether (1:5), is 101–102° C.

(b) SAPONIFICATION OF THE ETHYL ESTER OF N-TRITYL-DL-α-ALANINE 1 g. of the crude trityl ester obtained as described hereinabove under (a) is saponified by boiling with 20 cc. of a solution of 20% potassium hydroxide in propylene glycol for 5 minutes. The mixture is diluted with 20 cc. of water and, after cooling, is acidified by means of acetic acid. N-trityl-DL-α-alanine precipitates in the form of an oil which is extracted with chloroform. The chloroform extract is dried over magnesium sulfate and is concentrated by evaporation to a small volume. Toluene is added during said concentration. Distillation is discontinued after the chloroform and a small amount of toluene have been distilled off. The concentrate is allowed to crystallize. The crystals are filtered, washed with toluene, and dried. The resulting N-trityl-DL-α-alanine has no sharp melting point and melts at about 170° C. The yield amounts to about 95%.

N-trityl-DL-α-alanine is only slightly soluble in most organic solvents and insoluble in water. Its triethylamine salt dissolves readily in chloroform.

Analysis.—$C_{22}H_{21}O_2N$ (molecular weight 331.4).—Calculated: 79.73% C; 6.39% H; 4.23% N. Found: 79.8% C; 6.5% H; 4.3% N.

EXAMPLE 4

Preparation of N-trityl-DL-serine

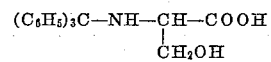

(a) PREPARATION OF THE ETHYL ESTER OF N-TRITYL-DL-SERINE 1.7 g. of the hydrochloride of the ethyl ester of DL-serine are dissolved in 20 cc. of chloroform containing 3 cc. of triethylamine. The solution is reacted with 2.8 g. of triphenyl methyl chloride as described hereinabove in Example 1 under (a). The reaction mixture is worked up in the same manner as disclosed in said example. Thereby, a crude ester is obtained which is recrystallized from petroleum ether. 3.4 g. of the ethyl ester of N-trityl-DL-serine melting at 111–112° C. are obtained thereby. The yield amounts to 90%.

(b) SAPONIFICATION OF THE ETHYL ESTER OF N-TRITYL-DL-SERINE

The ester obtained as described hereinabove under (a) is saponified by boiling under reflux in a 20% potassium hydroxide solution in methanol for 2 minutes. The mixture is diluted with water and, after cooling, acidified by means of acetic acid. A compound is obtained which contains considerable amounts of inorganic matter, as determined by combustion. Said product is recrystallized from methyl ethyl ketone. The first fraction melting at about 225° C. which crystallizes rapidly and still contains inorganic matter is removed. The mother liquors are concentrated by evaporation, cooled in ice, allowed to stand for a prolonged period of time, and filtered. N-trityl-DL-serine is obtained thereby in a yield of 65%.

It melts at about 180° C. It is soluble in acetone, benzene, chloroform, ether, soluble on heating in aqueous methyl ethyl ketone, and insoluble in water. The compound forms a salt with triethylamine which is soluble in chloroform.

*Analysis.*—$C_{22}H_{21}O_3N$ (molecular weight 347.4).—Calculated: 76.06% C; 6.09% H; 4.03% N. Found: 75.8% C; 6.3% H; 4.0% N.

EXAMPLE 5

*Preparation of N-trityl glycyl glycine*

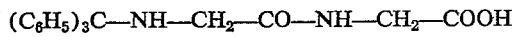

(a) PREPARATION OF A CHLOROFORM SOLUTION OF THE MIXED ANHYDRIDE OF N-TRITYL GLYCINE WITH MONO-ETHYL CARBONATE

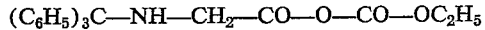

3.17 g. of N-trityl glycine prepared according to the process described in Example 1 are dissolved in 30 cc. of anhydrous chloroform containing 2 cc. of triethylamine. The solution is cooled to −10° C. 1.1 cc. of the ethyl ester of chloro formic acid are added thereto. The mixture is allowed to stand for 1½ hours in an ice bath.

(b) CONDENSATION OF THE MIXED ANHYDRIDE WITH THE HYDROCHLORIDE OF THE ETHYL ESTER OF GLYCINE 1.4 g. of the hydrochloride of the ethyl ester of glycine are dissolved in 14 cc. of chloroform containing 2 cc. of triethylamine. Said solution is added to the solution of the mixed anhydride in chloroform prepared as described hereinabove under (a) which is placed in an ice-water bath. After addition of the ethyl ester hydrochloride, the mixture is taken out of the ice-water bath and is allowed to stand for one hour at room temperature. The solution is then washed with water, ammonia, and again with water. It is dried over magnesium sulfate, filtered, and evaporated to dryness in a vacuum on a water bath. The oily residue is dissolved in benzene and is caused to crystallize by the addition of petroleum ether. The crystals are filtered and washed with petroleum ether. 3.6 g. of the ethyl ester of N-trityl glycyl glycine are obtained thereby. Its melting point is 162° C. The yield amounts to 90%. Said compound can directly be used for saponification to the corresponding free N-trityl peptide. The compound melts, after recrystallization from benzene, at 163–164° C. It contains solvent of crystallization. For analytical purposes it is dried in a vacuum at 120° C. whereby it loses about 8% of its weight.

*Analysis.*—$C_{25}H_{26}O_3N_2$ (molecular weight: 402.5).— Calculated: 74.6% C; 6.51% H; 6.96% N. Found: 74.8 C; 6.7% H; 7.0% N.

(c) SAPONIFICATION OF THE ETHYL ESTER OF N-TRITYL GLYCYL GLYCINE

The ethyl ester of N-trityl glycyl glycine obtained as described hereinabove under (b) is heated under reflux with 2 parts by volume of a 20% potassium hydroxide solution in methanol for 2 minutes. The mixture is diluted by the addition of 10 parts by volume of water. Methanol is distilled off. The residue is cooled and acidified with acetic acid. N-trityl glycyl glycine precipitates in the form of a gel which is converted into fine needles by the addition of a small amount of ether. The crystals are filtered off and washed with water. The crude compound obtained thereby contains some moisture. It can directly be used for splitting off the trityl group and conversion into glycyl glycine.

EXAMPLE 6

*Preparation of glycyl glycine by hydrolysis of N-trityl glycyl glycine*

The crude moist N-trityl glycyl glycine obtained as described hereinabove according to Example 5 under (c) is heated under reflux with about 5 parts by volume of an aqueous 50% acetic acid solution for 2 minutes. Triphenyl carbinol crystallizes and is filtered after cooling the mixture. The crystals are washed with a small amount of water. The wash waters are added to the acetic acid filtrate. Filtrate and wash water are concentrated by evaporation to a small volume. Ethanol is added thereto. Glycyl glycine crystallizes in small leaflets which are filtered and washed with ethanol. The yield amounts to 85% calculated for the ethyl ester of N-trityl glycyl glycine. The melting point is 210–215° C. (with decomposition).

EXAMPLE 7

*Preparation of N-trityl glycyl tryptophan*

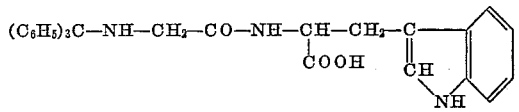

(a) PREPARATION OF A SOLUTION OF THE MIXED ANHYDRIDE OF N-TRITYL GLYCINE WITH MONO-ETHYL CARBONATE IN CHLOROFORM

Said solution is prepared in the same manner as described hereinabove in Example 5 under (a).

(b) CONDENSATION OF THE MIXED ANHYDRIDE WITH THE HYDROCHLORIDE OF THE METHYL ESTER OF DL-TRYPTOPHAN 5.2 g. of the hydrochloride of the methyl ester of tryptophan are dissolved in 40 cc. of chloroform containing 4 cc. of triethylamine. Said solution is added to the solution of the mixed anhydride in chloroform prepared as described hereinabove under (a). Condensation is effected by following the procedure described in Example 5 under (b). The crude ester of the N-trityl peptide is caused to crystallize by dissolving it in benzene. 9.3 g. of the methyl ester of N-trityl glycyl tryptophan are obtained thereby. The yield amounts to 90%. On recrystallization from ethanol, the compound has a melting point of 164–165° C. It is soluble in acetone, chloroform, and dilute aqueous alkali hydroxide solutions, only slightly soluble in ethanol, ether, and benzene, and insoluble in water.

*Analysis.*—$C_{33}H_{31}O_3N_3$ (molecular weight: 517.61).— Calculated: 76.57% C; 6.04% H; 8.12% N. Found: 76.6% C; 6.3% H; 8.2% N.

(c) SAPONIFICATION OF THE METHYL ESTER OF N-TRITYL GLYCYL-DL-TRYPTOPHAN

The ethyl ester of N-trityl glycyl-DL-tryptophan obtained as described herein above under (b) is saponified and treated by following the procedure described in Example 5 under (c). After washing with water and drying, crude N-trityl glycyl-DL-tryptophan is obtained in a yield of 85%. Said crude compound can directly be hydrolyzed, without any further working up, to glycyl-DL-tryptophan.

EXAMPLE 8

*Preparation of glycyl-DL-tryptophan by hydrolysis of N-trityl glycyl-DL-tryptophan*

The crude N-trityl glycyl-DL-tryptophan obtained as described hereinabove according to Example 7 under (c), is hydrolyzed with aqueous 50% acetic acid by following the procedure according to Example 6. The yield of the crude dipeptide amounts to 80% calculated for crude N-trityl peptide subjected to said hydrolysis. The compound is purified by dissolving it in aqueous sodium hydroxide solution and causing crystallization by acidifying the solution with acetic acid. The resulting pure N-glycyl-DL-tryptophan melts at about 280° C.

*Analysis.*—$C_{13}H_{15}O_3N_3$ (molecular weight: 261.28).— Calculated: 59.76% C; 5.79% H; 16.08% N. Found: 59.3% C; 6.0% H; 16.0% N.

EXAMPLE 9

*Preparation of N-trityl-DL-α-alanyl glycine*

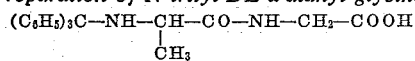

(a) PREPARATION OF A SOLUTION OF THE MIXED ANHYDRIDE OF N-TRITYL-DL-α-ALANINE WITH MONOETHYL CARBONATE IN CHLOROFORM

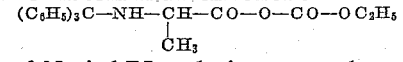

1.7 g. of N-trityl-DL-α-alanine prepared according to Example 3, are dissolved in 15 cc. of anhydrous chloroform containing 1 cc. of triethylamine. The solution is cooled to −10° C. 0.55 cc. of the ethyl ester of chloroformic acid are added thereto. The mixture is allowed to stand for 1½ hours in an ice bath.

(b) CONDENSATION OF THE MIXED ANHYDRIDE WITH THE HYDROCHLORIDE OF THE ETHYL ESTER OF GLYCINE 0.7 g. of the hydrochloride of the ethyl ester of glycine are dissolved in 7 cc. of chloroform containing 1 cc. of triethylamine. Said solution is added to the solution of the mixed anhydride in chloroform prepared as described hereinabove under (a). Condensation is effected by following the procedure according to Example 5 under (b). The resulting ethyl ester of N-trityl-DL-α-alanyl glycine is obtained in crystalline form by dissolving the oily crude ester in a mixture of benzene and petroleum ether (1:5). The crystals are filtered, washed with a small amount of petroleum ether, and dried. 1.6 g. of the ethyl ester of the N-trityl peptide are obtained thereby. Its melting point is 147–148° C. The yield amounts to 80%. The compound is soluble in acetone and chloroform, only slightly soluble in ethanol, ether, and benzene, and insoluble in water and aqueous alkali hydroxide solutions.

*Analysis.*—$C_{26}H_{28}O_3N_2$ (molecular weight: 416.5).—Calculated: 74.97% C; 6.78% H; 6.73% N. Found: 75.4% C; 6.8% H; 6.6% N.

(c) SAPONIFICATION OF THE ETHYL ESTER OF N-TRITYL-DL-α-ALANYL GLYCINE

The ethyl ester of N-trityl-DL-α-alanyl glycine obtained as described hereinabove under (b) is heated under reflux with 2 parts by volume of a 20% potassium hydroxide solution in methanol for 2 minutes. The saponification mixture is worked up by following the procedure according to Example 5 under (c). The resulting crude N-trityl-DL-α-alanyl glycine is washed with water and dried and can directly be used for splitting off the trityl group and for conversion into DL-α-alanyl glycine.

EXAMPLE 10

*Preparation of DL-α-alanyl glycine by hydrolysis of N-trityl-DL-α-alanyl glycine*

The crude N-trityl-DL-α-alanyl glycine obtained as described hereinabove according to Example 9 under (c) is heated under reflux with about 5 parts by volume of an aqueous 50% acetic acid solution for 2 minutes. The hydrolysis mixture is worked up by following the procedure according to Example 6. DL-α-alanyl glycine is obtained in a yield of 80%.

EXAMPLE 11

*Preparation of N-trityl-DL-α-alanyl-DL-serine*

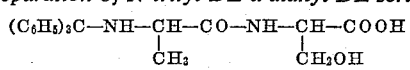

(a) PREPARATION OF A SOLUTION OF THE MIXED ANHYDRIDE OF N-TRITYL-DL-α-ALANINE WITH MONOETHYL CARBONATE IN CHLOROFORM

Said solution is prepared in the same manner as described hereinabove in Example 9 under (a).

(b) CONDENSATION OF THE MIXED ANHYDRIDE WITH THE ETHYL ESTER OF DL-SERINE 1.7 g. of the hydrochloride of the ethyl ester of serine are dissolved in 17 cc. of chloroform containing 2 cc. of triethylamine. Said solution is added to the solution of the mixed anhydride in chloroform prepared as described hereinabove in Example 9 under (a). The procedure followed in this condensation reaction is the same as that described in Example 5 under (b). The resulting residue remaining after evaporating the chloroform is dissolved in benzene. The residue which is insoluble in benzene is removed and the benzene solution is concentrated by evaporation. By the addition of petroleum ether to said concentrated benzene solution, the ethyl ester of N-trityl-DL-α-alanyl serine is obtained in the form of large prisms. The crystals are filtered, washed with petroleum ether and dried. 3 g. of the ethyl ester of N-trityl-DL-α-alanyl serine having a melting point of 172–173° C. are obtained thereby. The yield amounts to 68%. The ester is soluble in acetone and chloroform, soluble on heating, in benzene, only slightly soluble in ethanol, and ether, and insoluble in water.

*Analysis.*—$C_{27}H_{30}O_4N_2$ (molecular weight: 446.53).—Calculated: 72.62% C; 6.77% H; 6.27% N. Found: 72.7% C; 6.7% H; 6.4% N.

(c) SAPONIFICATION OF THE ETHYL ESTER OF N-TRITYL-DL-α-ALANYL SERINE

The ethyl ester of N-trityl-DL-α-alanyl serine obtained as described hereinabove under (b) is heated under reflux with 2 parts by volume of 20% potassium hydroxide solution in methanol for 2 minutes. The saponification mixture is then worked up as described hereinabove in Example 5 under (c). The resulting crude N-trityl-DL-α-alanyl serine is precipitated by means of acetic acid. After washing with water it can directly be used for splitting off the trityl group and for conversion into DL-α-alanyl serine.

EXAMPLE 12

*Preparation of DL-α-alanyl-DL-serine by hydrolysis of N-trityl-DL-α-alanyl-DL-serine*

The crude and moist N-trityl-DL-α-alanyl-DL-serine obtained as described hereinabove according to Example 11 under (c) is hydrolyzed by heating under reflux with about 5 parts by volume of an aqueous 50% acetic acid solution for 2 minutes. The hydrolysis mixture is worked up by following the procedure as described hereinabove in Example 6. By ethanol addition the peptide is precipitated in the form of an oil. The ethanol solution is decanted therefrom. The oil is dissolved in about 1 part by volume of concentrated hydrochloric acid. 10 parts by volume of acetone are added thereto. Thereby the hydrochloride of DL-α-alanyl-DL-serine crystallizes. It is filtered and washed with acetone. The yield amounts to 60% calculated for the ethyl ester of N-trityl-DL-α-alanyl-DL-serine. The compound can be recrystallized by dissolving in the minimum amount of N hydrochloric acid and by adding acetone to said solution. Colorless needles are obtained thereby. The compound has an unsharp melting point of 190–195° C.

*Analysis.* — $C_6H_{13}O_4N_2Cl$ (molecular weight: 212.64).—Calculated: 33.89% C; 6.16% H; 13.18% N; 16.67% Cl. Found: 34.0% C; 6.3% H; 12.8% N; 16.1% Cl.

EXAMPLE 13

*Preparation of N-trityl-DL-α-alanyl-DL-tryptophan*

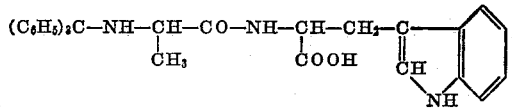

(a) PREPARATION OF A SOLUTION OF THE MIXED ANHYDRIDE OF N-TRITYL-LD-α-ALANINE WITH MONOETHYL CARBONATE IN CHLOROFORM

Said solution is prepared in the same manner as described hereinabove in Example 9 under (a).

(b) CONDENSATION OF THE MIXED ANHYDRIDE WITH THE METHYL ESTER OF TRYPTOPHAN

A solution of 2.6 g. of the hydrochloride of the methyl ester of DL-tryptophan in 26 cc. of chloroform containing 2 cc. of triethylamine is added to the solution of the mixed anhydride in chloroform prepared as described hereinabove under (a). The reaction mixture is then treated by following the procedure described in Example 5 under (b). Thereby, the methyl ester of N-trityl-DL-α-alanyl-DL-tryptophan is obtained in crystalline form. The crystals are treated with benzene, filtered, washed with benzene, and dried. Thereby, 4.8 g. of the methyl ester of N-trityl-DL-α-alanyl-DL-tryptophan melting at 211–212° C. are obtained. The yield amounts to 90%. The ester is soluble in acetone and chloroform, only slightly soluble in ethanol, ether, and benzene, and insoluble in water.

Analysis.—$C_{34}H_{33}O_3N_3$ (molecular weight: 531.63).—Calculated: 76.81% C; 6.26% H; 7.90% N. Found: 76.7% C; 6.5% H; 8.1% N.

(c) SAPONIFICATION OF THE METHYL ESTER OF N-TRITYL-DL-α-ALANYL-DL-TRYPTOPHAN

The methyl ester of N-trityl-DL-α-alanyl-DL-tryptophan obtained as described hereinabove under (b) is heated under reflux with 2 parts by volume of a 20% potassium hydroxide solution in methanol for 2 minutes. The saponification mixture is then worked up by following the procedure described hereinabove in Example 5 under (c). The resulting crude N-trityl-DL-α-alanyl-DL-tryptophan is filtered and washed with water. It can directly be used for splitting off the trityl group and for conversion into DL-α-alanyl-DL-tryptophan.

EXAMPLE 14

*Preparation of DL-α-alanyl-DL-tryptophan by hydrolysis of N-trityl-DL-α-alanyl-DL-tryptophan*

The crude and moist N-trityl-DL-α-alanyl-DL-tryptophan obtained as described hereinabove in Example 13 under (c) is heated under reflux with about 5 parts by volume of an aqueous 50% acetic acid solution for 2 minutes. The hydrolysis mixture is worked up by following the procedure according to Example 6. The resulting dipeptide is precipitated by the addition of ethanol and is recrystallized from water or aqueous ethanol. The compound contains water or solvent of crystallization and loses 7% of its weight by drying in a vacuum at 120° C. It melts at 210° C. thereby losing its water or solvent of crystallization and subsequently solidifies and melts again at about 250° C. The yield amounts to about 85% calculated for the ester of the N-trityl dipeptide.

Analysis of the compound free from water or solvent of crystallization.—$C_{14}H_{17}O_3N_3$ (molecular weight: 175.31). Calculated: 61.08% C; 6.22% H; 15.26% N. Found: 61.2% C; 6.4% H; 15.3% N.

In place of chloroform, the most preferred solvent used in the preceding examples, there can be employed other indifferent organic solvents which do not react with and are not affected by the reactants, such as methylene chloride, benzene, tetrahydrofuran.

In place of triethylamine used in the preceding examples as acid binding agent there can be employed other acid binding agents, and especially tertiary bases, such as pyridine, methyl ethyl pyridine, dimethyl aniline.

Saponification of the esters of N-trityl-α-amino acids or N-trityl peptides can be effected by other saponifying agents than alcoholic alkali hydroxide solutions or solution of alkali hydroxide in propylene glycol, as used in the examples.

Hydrolysis of the N-trityl peptide is preferably effected, as illustrated in the examples, by boiling said compound under reflux with about 5 times its volume of about 50% acetic acid. Almost instantaneous hydrolysis takes place. Good results are also achieved with acetic acid of other concentration, for instance, of a concentration between about 10% and about 90%. The amount of dilute acetic acid employed should not be less than 1 times the volume of the N-trityl peptide to be hydrolyzed. A larger volume may, of course, also be used, however, without producing any further beneficial result.

The new process as claimed hereinafter represents a remarkable improvement over the prior art processes of making di- and polypeptides and, therefore, will be of great value in the ultimate synthesis of protein-like compounds. The new compounds obtained in this new process represent valuable intermediates in the synthesis of such protein-like compounds and may be used for nutritional purposes, for instance, in place of protein hydrolysates. They permit the administration of very definite and specific peptides to overcome certain amino acid deficiencies and are of considerable advantage over such protein hydrolysates because they allow proper and precise dosage. The peptides can, of course, also be used for technical purposes in place of protein hydrolysates and the like.

We claim:

1. In a process of producing peptides of the formula

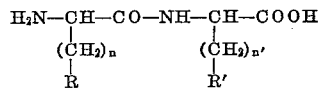

wherein R and R' are members selected from the group consisting of hydrogen, the hydroxyl group, and the indolyl group, and n and n' are numerals from 0 to 2, the step comprising heating to boiling under reflux an N-trityl peptide of the formula

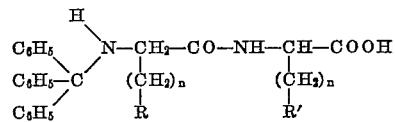

wherein R and R' and n and n' represent the same members and numerals set forth above, with an about 50% aqueous acetic acid solution until the trityl group is split off.

2. In a process of producing peptides of the formula

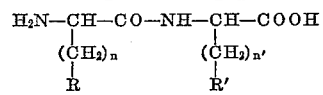

wherein R and R' are members selected from the group consisting of hydrogen, the hydroxyl group, and the indolyl group, and n and n' are numerals from 0 to 2, the steps comprising mixing a chloroform solution of the mixed anhydride of an N-trityl substituted α-amino acid with an α-amino acid compound selected from the group consisting of an acid ester, acid amide, and acid anilide of an α-amino acid, at a temperature of about 0° C., allowing the mixture to stand at about room temperature until condensation of said N-trityl substituted α-amino acid with said α-amino acid compound is substantially completed, washing the resulting reaction solution, drying the washed solution, evaporating the dried solution to drynesss, crystallizing the resulting oily evaporation residue, heating under reflux the crystals of the resulting N-trityl peptide condensation product with a potassium hydroxide solution in methanol until saponification of said condensation product to the corresponding N-trityl peptide is completed, and heating said N-trityl peptide with about 50% aqueous acetic acid until the trityl group is split off.

3. The process according to claim 2 wherein the mixed anhydride of an N-trityl substituted α-amino acid is the mixed anhydride obtained by mixing the chloroform solution of an N-trityl substituted α-amino acid with the lower alkyl ester of chloroformic acid with the addition of triethylamine at a temperature of about −10° C. and allowing the reaction mixture to stand at a temperature not substantially exceeding 0° C. until the mixed anhydride is formed.

4. The process according to claim 3, wherein the lower alkyl ester of chloroformic acid is the ethyl ester of chloroformic acid.

5. In the process of producing glycyl glycine, the steps comprising adding the chloroform solution of the hydrochloride of the ethyl ester of glycine, said solution containing triethylamine, at a temperature substantially not exceeding 0° C. to the chloroform solution of the mixed anhydride of N-trityl glycine and ethyl carbonic acid, allowing the mixture to stand at about room temperature until condensation of the ethyl ester of glycine with N-trityl glycine is substantially completed, separating the resulting condensation product in crystalline form from the reaction solution, heating the crystals of said condensation product with a methanolic potassium hydroxide solution until saponification of the ester group is substantially completed, and heating the resulting N-trityl glycyl glycine with an about 50% aqueous acetic acid solution until the trityl group is split off.

6. In the process of producing glycyl tryptophan, the steps comprising adding the chloroform solution of the hydrochloride of the methyl ester of tryptophan, said solution containing triethylamine, at a temperature substantially not exceeding 0° C. to the chloroform solution of the mixed anhydride of N-trityl glycine and ethyl carbonic acid, allowing the mixture to stand at about room temperature until condensation of the methyl ester of tryptophan with N-trityl glycine is substantially completed, separating the resulting condensation product in crystalline form from the reaction solution, heating the crystals of said condensation product with a methanolic potassium hydroxide solution until saponification of the ester group is substantially completed, and heating the resulting N-trityl glycyl tryptophan with an about 50% aqueous acetic acid solution until the trityl group is split off.

7. In the process of producing α-alanyl glycine, the steps comprising adding the chloroform solution of the hydrochloride of the ethyl ester of glycine, said solution containing triethylamine, at a temperature substantially not exceeding 0° C. to the chloroform solution of the mixed anhydride of N-trityl-α-alanine and ethyl carbonic acid, allowing the mixture to stand at about room temperature until condensation of the ethyl ester of glycine with N-trityl-α-alanine is substantially completed, separating the resulting condensation product in crystalline form from the reaction solution, heating the crystals of said condensation product with a methanolic potassium hydroxide solution until saponification of the ester group is substantially completed, and heating the resulting N-trityl-α-alanyl glycine with an about 50% aqueous acetic acid solution until the trityl group is split off.

8. In the process of producing α-alanyl serine, the steps comprising adding the chloroform solution of the hydrochloride of the ethyl ester of serine, said solution containing triethylamine, at a temperature substantially not exceeding 0° C. to the chloroform solution of the mixed anhydride of N-trityl-α-alanine and ethyl carbonic acid, allowing the mixture to stand at about room temperature until condensation of the ethyl ester of serine with N-trityl-α-alanine is substantially completed, separating the resulting condensation product in crystalline form from the reaction solution, heating the crystals of said condensation product with a methanolic potassium hydroxide solution until saponification of the ester group is substantially completed, and heating the resulting N-trityl-α-alanyl serine with an about 50% aqueous acetic acid solution until the trityl group is split off.

9. In the process of producing α-alanyl tryptophan, the steps comprising adding the chloroform solution of the hydrochloride of the methyl ester of tryptophan, said solution containing triethylamine, at a temperature substantially not exceeding 0° C. to the chloroform solution of the mixed anhydride of N-trityl-α-alanine and ethyl carbonic acid, allowing the mixture to stand at about room temperature until condensation of the methyl ester of tryptophan with N-trityl alanine is substantially completed, separating the resulting condensation product in crystalline form from the reaction solution, heating the crystals of said condensation product with a methanolic potassium hydroxide solution until saponification of the ester group is substantially completed, and heating the resulting N-trityl-α-alanyl tryptophan with an about 50% aqueous acetic acid solution until the trityl group is split off.

References Cited in the file of this patent

Elbs: Ber. Deut. Chem., vol. 17, pp. 701–6 (1884).
Benary et al.: Berichte, vol. 57 (1924), pp. 1324–27.
Helferich et al.: Ber. Deut. Chem., vol. 58, p. 885 (1925).
Jones: J.A.C.S., vol. 50, pp. 1150–4 (1928).
Anson et al.: Advances in Protein Chemistry, vol. 5, pp. 25–32 and 72 (1949), Academic Press Inc., N.Y.
Wieland: Angew. Chem. 163 (1951), No. 1, p. 12.
Beilstein: Handbook of Organic Chem., vol. 12, p. 1344; 1st supp., vol. 12, pp. 557–8; 2nd supp., vol. 12, pp. 791–2.